US012772150B2

(12) United States Patent
Zhang et al.

(10) Patent No.: US 12,772,150 B2
(45) Date of Patent: Oct. 20, 2026

(54) NETWORK ACCESS GUIDE METHOD, APPARATUS, AND ELECTRONIC DEVICE

(71) Applicant: VIVO MOBILE COMMUNICATION CO., LTD., Dongguan (CN)

(72) Inventors: Yizhong Zhang, Dongguan (CN); Yanchao Kang, Dongguan (CN); Lufeng Han, Dongguan (CN); Wen Wang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 602 days.

(21) Appl. No.: 18/127,656

(22) Filed: Mar. 29, 2023

(65) Prior Publication Data

US 2023/0239773 A1 Jul. 27, 2023

Related U.S. Application Data

(63) Continuation of application No. PCT/CN2021/121831, filed on Sep. 29, 2021.

(30) Foreign Application Priority Data

Sep. 30, 2020 (CN) ........................ 202011063730.8

(51) Int. Cl.

*H04W 48/16* (2009.01)
*H04W 36/08* (2009.01)
*H04W 48/18* (2009.01)
*H04W 60/06* (2009.01)

(52) U.S. Cl.

CPC ........... *H04W 48/16* (2013.01); *H04W 36/08* (2013.01); *H04W 48/18* (2013.01); *H04W 60/06* (2013.01)

(58) Field of Classification Search

CPC ..... H04W 48/16; H04W 36/08; H04W 48/18; H04W 60/06; H04W 48/12

See application file for complete search history.

(56) References Cited

U.S. PATENT DOCUMENTS 11,405,851 B2 * 8/2022 Talebi Fard .......... H04W 48/04
2020/0275332 A1 8/2020 Chong et al.

FOREIGN PATENT DOCUMENTS

WO 2017003255 A1 1/2017
WO 2018166306 A1 9/2018
WO 2020006809 A1 1/2020

OTHER PUBLICATIONS

International Search Report issued in corresponding International Application No. PCT/CN2021/121831, mailed Dec. 30, 2021, 6 pages.

Vivo, Solution #X: The quick return to PLMN with Disaster Condition, 3GPP TSG-CT WG1 Meeting #127bis-e, C1-210177, Jan. 2021, 2 pages.

(Continued)

*Primary Examiner* — Diane D Mizrahi
(74) *Attorney, Agent, or Firm* — IPX PLLC

(57) ABSTRACT

A network access guide method for a terminal to access a first network, an apparatus, and an electronic device are provided. The network access guide method includes: sending assistance information to an access network side device of a second network by a core network functional entity of the second network, where the assistance information is used to instruct the terminal access the first network.

14 Claims, 7 Drawing Sheets

(56) References Cited

OTHER PUBLICATIONS

Vivo, Solution #X: The quick return to PLMN with Disaster Condition, 3GPP TSG-CT WG1 Meeting #127bis-e, C1-210391, Jan. 2021, 2 pages.
Samsung, FS_MINT 22831 P-CR: Disaster Begins and Ends Use Cases, 3GPP TSG-SA WG1 Meeting #86, 81-191108, May 2019, 3 pages.
3GPP, Technical Specification Group Services and System Aspects; Study on Support for Minimization of Service Interruption (Release 17), 3GPP TR 22.831 V17.1.0, Dec. 2019, 19 pages.
Samsung, FS_MINT 22831 P-CR: Disaster Begins and Ends Use Cases, 3GPP TSG-SA WG1 Meeting #86, S1-191423, May 2019, 3 pages.
LG Electronics et al., Update of Section 5.8, 3GPP TSG-SA WG Meeting #87, S1-192024, Aug. 2019, 2 pages.
First Office action issued in related Chinese Application No. 202011063730.8 mailed Dec. 5, 2022, 5 pages.
3GPP, Technical Specification Group Services and System Aspects; Study on Support for Minimization of Service Interruption (Release 17), 3GPP TR 22.831 V0.2.0, S1-192361, Aug. 2019, 20 pages.
3GPP, Technical Specification Group Services and System Aspects; Study on Support for Minimization of Service Interruption (Release 17), 3GPP TR 22.831 V0.12.10, Aug. 24 pages.
Second Office action issued in related Chinese Application No. 202011063730.8 mailed Jun. 14, 2023, 7 pages.

* cited by examiner

NETWORK ACCESS GUIDE METHOD, APPARATUS, AND ELECTRONIC DEVICE

CROSS-REFERENCE TO RELATED APPLICATIONS

This application is a continuation of International Application No. PCT/CN2021/121831, filed Sep. 29, 2021, which claims priority to Chinese Patent Application No. 202011063730.8, filed Sep. 30, 2020. The entire contents of each of the above-referenced applications are expressly incorporated herein by reference.

TECHNICAL FIELD

This application relates to the field of communications technologies, and in particular, to a network access guide method, an apparatus, and an electronic device.

BACKGROUND

In a case that a first network is under a disaster condition, to reduce the impact of the first network, a second network can provide services for User Equipment (UE) of the first network. However, the UE of the first network occupies a resource of the second network under a non-disaster condition, thereby causing a bad UE experience of the second network.

SUMMARY

Embodiments of this application provide a network access guide method, an apparatus, and an electronic device, which can prevent a first network UE from continuing to occupy a second network resource after a disaster condition ends, thereby causing bad experience of a second network UE.

According to a first aspect, an embodiment of this application provides a network access guide method for a terminal to access a first network, and the method includes:

sending assistance information to an access network side device of a second network by a core network functional entity of the second network, where the assistance information is used to instruct the terminal to access the first network.

According to a second aspect, an embodiment of this application provides a network access guide method for a terminal to access a first network, and the method includes:

receiving assistance information from a core network functional entity of a second network by an access network side device of the second network, where the assistance information is used to instruct the terminal to access a first network;

and sending the assistance information through an air interface.

According to a third aspect, an embodiment of this application provides a network access guide method for a terminal to access a first network, and the method includes:

receiving assistance information from an access network side device of a second network by a first terminal, where the assistance information is used to instruct the first terminal to access the first network; and executing a deregistration process by the first terminal based on the assistance information.

According to a fourth aspect, an embodiment of this application provides a network access guide method, and the method includes:

sending first information to a core network functional entity of a second network or an access network side device of a second network by a first network side device, where the first information instructs a terminal to access a first network.

According to a fifth aspect, an embodiment of this application provides a network access guide apparatus, and the apparatus includes:

a sending module, configured to send assistance information to a second network access network side device, where the assistance information is used to instruct a terminal to access a first network.

According to a sixth aspect, an embodiment of this application provides a network access guide apparatus, and the apparatus includes:

a receiving module, configured to receive assistance information from a core network functional entity of a second network, where the assistance information is used to instruct a terminal to access a first network; and a sending module, configured to send the assistance information through an air interface.

According to a seventh aspect, an embodiment of this application provides a network access guide apparatus, and the apparatus includes:

a receiving module, configured to receive assistance information of a second network access network side device, where the assistance information is used to instruct a first terminal to access a first network; and a deregistration module, configured to execute a deregistration process based on the assistance information.

According to an eighth aspect, an embodiment of this application provides a network access guide apparatus, and the apparatus includes:

A sending module, configured to send first information to a core network functional entity of a second network or an access network side device of a second network, where the first information instructs a terminal to access a first network.

According to a ninth aspect, an embodiment of this application further provides an electronic device, including a processor, a memory, and a program or an instruction stored in the memory and capable of running on the processor, where when the program or the instruction is executed by the processor, the steps of the foregoing method are implemented.

According to a tenth aspect, an embodiment of this application further provides a readable storage medium, where the readable storage medium stores a program or an instruction, and when the program or the instruction is executed by a processor, the steps of the foregoing method are implemented.

According to an eleventh aspect, an embodiment of this application provides a chip, where the chip includes a processor and a communications interface, the communications interface is coupled to the processor, and the processor is configured to run a program or an instruction, to implement the method according to the first aspect, the second aspect, the third aspect, or the fourth aspect.

In the embodiments of this application, after the disaster condition of the first network is terminated, the terminal that has accessed the first network can be notified that the disaster condition of the first network is terminated, so that the first network terminal deregisters the second network, performs PLMN selection, network selection, or network reselection, and prevents the first network UE from continuing to occupy the second network resource after the disaster condition is terminated causing bad experience of the second network UE.

BRIEF DESCRIPTION OF DRAWINGS

To describe the technical solutions in the embodiments of this application more clearly, the following briefly describes the accompanying drawings for describing the embodiments of this application. Apparently, the accompanying drawings in the following description show merely some embodiments of this application, and a person of ordinary skill in the art may derive other drawings from these accompanying drawings without creative efforts.

DETAILED DESCRIPTION

Figure 1:
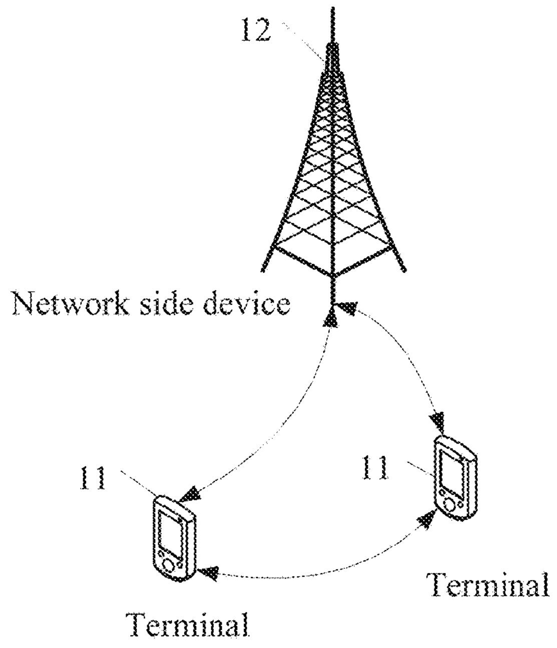
FIG. 1 is a schematic diagram of a wireless communications system.

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

The terms "first", "second", and the like in this specification and claims of this application are used to distinguish between similar objects instead of describing a specific order or sequence. It should be understood that the data used in this way is interchangeable in appropriate circumstances so that the embodiments of this application described can be implemented in other orders than the order illustrated or described herein. In addition, in the specification and the claims, "and/or" represents at least one of connected objects, and a character "/" generally represents an "or" relationship between associated objects.

The technologies described herein are not limited to Long Term Evolution (LTE)/LTE-Advanced (LTE-A) systems, and may also be used in various wireless communications systems, such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and other systems. The terms "system" and "network" are often interchangeably used. The CDMA system may implement wireless technologies such as CDMA2000 and universal terrestrial radio access (UTRA). UTRA includes wideband CDMA (WCDMA) and other CDMA variants. The TDMA system can implement a radio technology such as Global System for Mobile Communication (GSM). The OFDMA system may implement radio technologies such as Ultra Mobile Broadband (UMB), Evolution-UTRA (E-UTRA), IEEE 802.11 (Wi-Fi), IEEE 802.16 (WiMAX), IEEE 802.20, and Flash-OFDM. UTRA and E-UTRA are parts of the Universal Mobile Telecommunications System (UMTS). LTE and more advanced LTE (such as LTE-A) are new UMTS versions that use E-UTRA. UTRA, E-UTRA, UMTS, LTE, LTE-A, and GSM are described in the literature from an organization called the $3^{rd}$ Generation Partnership Project (3GPP). CDMA2000 and UMB are described in the literature from an organization called "$3^{rd}$ Generation Partnership Project 2" (3GPP2). The technologies described in this specification may be used in the systems and radio technologies mentioned above, and may also be used in another system and radio technology. However, an NR system is described in the following description for illustrative purposes, and an NR terminology is used in most of the following description, although these technologies can also be applied to applications other than the NR system application.

The following description provides examples without limiting the scope, applicability, or configuration set forth in the claims. Functions and arrangements of elements to be discussed may be changed without departing from the spirit and scope of the present disclosure. Various examples may be appropriately omitted or replaced, or various routines or components may be added. For example, the described method may be performed in an order different from that described, and steps may be added, omitted, or combined. In addition, features described with reference to some examples may be combined in other examples.

Referring to FIG. 1, FIG. 1 is a block diagram of a wireless communications system to which this embodiment of this application can be applied. The wireless communications system includes a terminal 11 and a network-side device 12. The terminal 11 may be referred to as a terminal device or User Equipment (UE). The terminal 11 may be a terminal side device such as a mobile phone, a tablet personal computer, a laptop computer, a Personal Digital Assistant (PDA), a Mobile Internet Device (MID), a wearable device, or an in-vehicle device. It should be noted that a specific type of the terminal 11 is not limited in this embodiment of this application. The network-side device 12 may be a base station or a core network, where the base station may be a base station of 5G or a later version (for example, gNB or 5G NR NB), or a base station in other communications systems (for example, an eNB, a WLAN access point, or another access point), or a location server (for example: E-SMLC or LMF (Location Manager Function)). The base station may be referred to as a NodeB, an evolved NodeB, an access point, a Base Transceiver Station (BTS), a radio base station, a radio transceiver, a Basic Service Set (BSS), an Extended Service Set (ESS), a Node B, an evolved node B (eNB), a home NodeB, a home evolved NodeB, a WLAN access point, a Wi-Fi node, or some other appropriate term in the art. As long as the same technical effect is achieved, the base station is not limited to a specific technical term. It should be noted that the base station in the NR system is taken only as an example in the embodiments of this application, but a specific type of the base station and a specific communications system are not limited in the embodiments of this application.

In the event of a disaster (such as a fire), a mobile network may not be able to provide services. Therefore, the mobile network is required to have the ability to mitigate the impact of service interruption. If a Public Land Mobile Network (PLMN) operator is prepared to provide services, the UE can obtain services in the event of a disaster. Service disruption is minimized and limited to a specific time and place. To reduce the impact on mobile networks that support roaming during a disaster, a potential congestion caused by inflow or outflow of inbound ramblers during a disaster is considered.

When a first network is under a disaster condition, a second network may provide services for first network UE to reduce the impact of the first network. However, once the disaster condition of the first network is terminated, the first network UE needs to be notified, to prevent the first network UE from occupying resources of the second network under non disaster conditions, causing bad experience of second network UE. The first network means a network under a disaster condition or a PLMN. The second network means a network or a PLMN providing services for the first network under a disaster condition.

Figure 2:
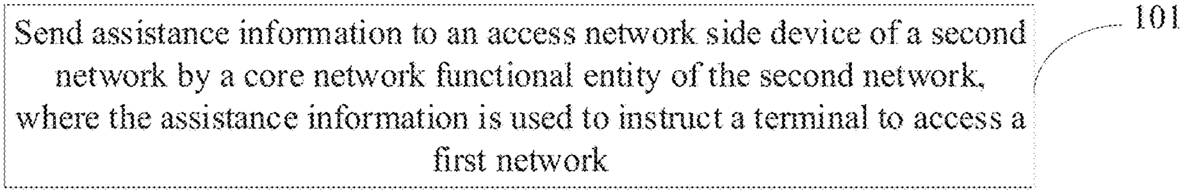
FIG. 2 to FIG. 5 are flowcharts of a network access guide method according to an embodiment of this application.

An embodiment of this application provides a network access guide method, as shown in FIG. 2, including:

Step 101: Send assistance information to a second network access network side device by a core network functional entity of a second network, where the assistance information is used to instruct a terminal to access a first network.

The core network functional entity of the second network side is a core network functional entity of a second network, and the access network side device of the second network is an access network side device of a second network side, such as a base station.

In some embodiments, the terminal has previously accessed the first network.

In some embodiments, the assistance information is sent through at least one of the following:

a non-access stratum (NAS) message; or a Next Generation Application Protocol (NGAP) message of an interface between a core network and an access network side device.

In some embodiments, the assistance information includes at least one of the following: information of the first network; indication information; a cause value; or information of the terminal.

In some embodiments, the indication information is at least one of the following: a deregistration message; or a release message.

In some embodiments, the cause value indicates that a disaster condition a disaster condition is terminated.

In some embodiments, the information of the terminal includes at least one of the following: a user identifier; or a device identifier of the terminal.

In some embodiments, before sending the assistance information to the access network side device of the second network by the core network functional entity of the second network, the method further includes:

receiving first information of the first network by the core network functional entity of the second network.

In some embodiments, the first information indicates that a disaster condition of the first network is terminated.

Figure 3:
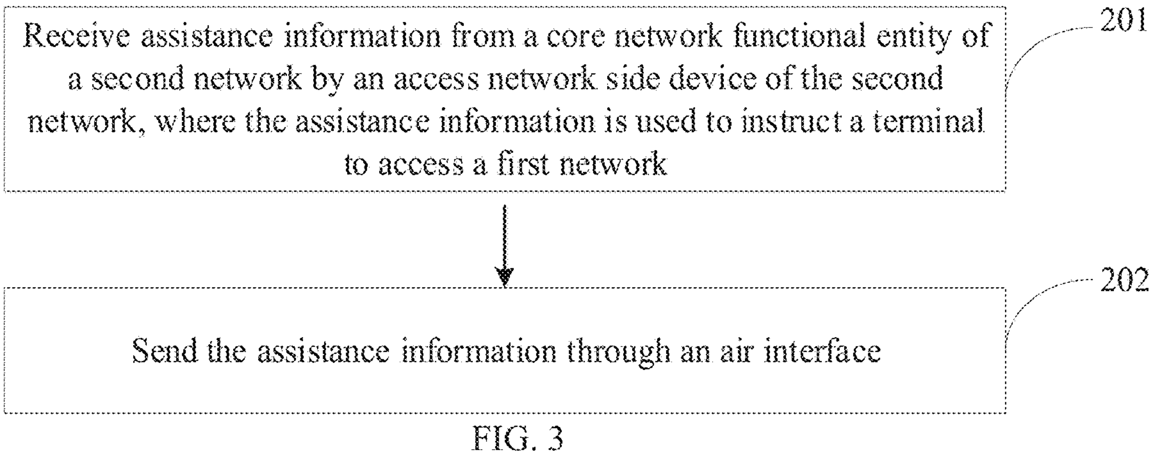

An embodiment of this application provides a network access guide method, as shown in FIG. 3, including:

Step 201: Receive assistance information of a core network functional entity of a second network by a second network access network side device, where the assistance information is used to instruct a terminal to access a first network; and send the assistance information through an air interface.

In some embodiments, the assistance information includes at least one of the following: information of the first network; indication information; a cause value; or information of the terminal.

In some embodiments, the indication information is at least one of the following: a deregistration message; or a release message.

In some embodiments, the cause value indicates that the disaster condition is terminated.

In some embodiments, the information of the terminal includes at least one of the following: a user identifier: or a device identifier of the terminal.

In some embodiments, the assistance information is sent through at least one of the following:

a broadcast message;

a non-access stratum (NAS) message; or an access stratum (AS) message.

Figure 4:
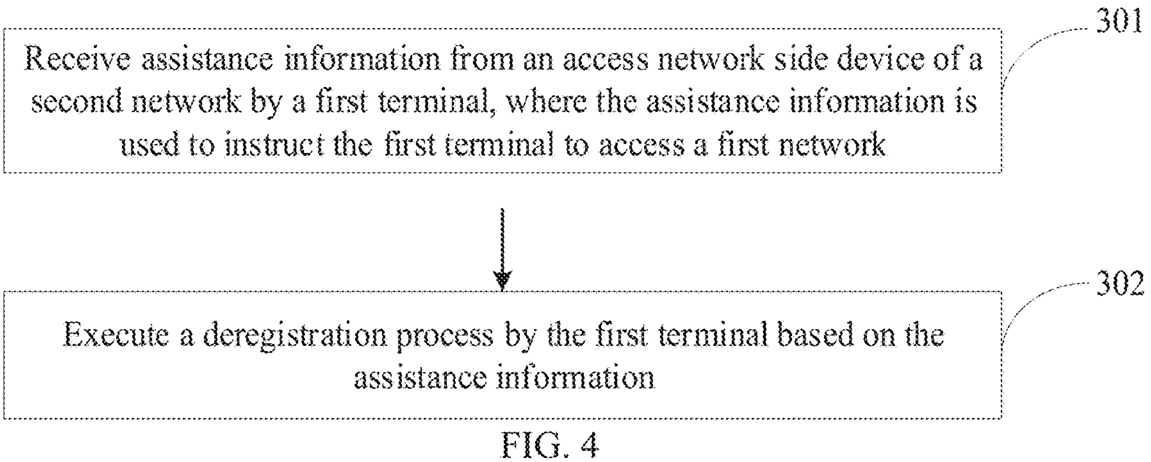

An embodiment of this application provides a network access guide method, as shown in FIG. 4, including the following steps.

Step 301: Receive assistance information of a second network access network side device by a first terminal, where the assistance information is used to instruct the first terminal to access a first network.

Step 302: Execute a deregistration process by the first terminal based on the assistance information.

In some embodiments, the first terminal has previously accessed the first network.

In some embodiments, the assistance information is included in at least one of the following:

a broadcast message;

a non-access stratum (NAS) message; or an access stratum (AS) message.

In some embodiments, the NAS message includes a deregistration request message and/or a rejection message for NAS request, and the AS message includes a rejection message for AS request.

In some embodiments, the following is further included:

performing public land mobile network PLMN selection, network selection, or network reselection by the first terminal based on the assistance information.

In some embodiments, the first terminal selects a PLMN out of a forbidden PLMN list.

In some embodiments, the following is further included:

receiving first information of the first network by the first terminal, where the first information indicates that a disaster condition of the first network is relieved, and the first information is contained in a system message of the first network.

Figure 5:
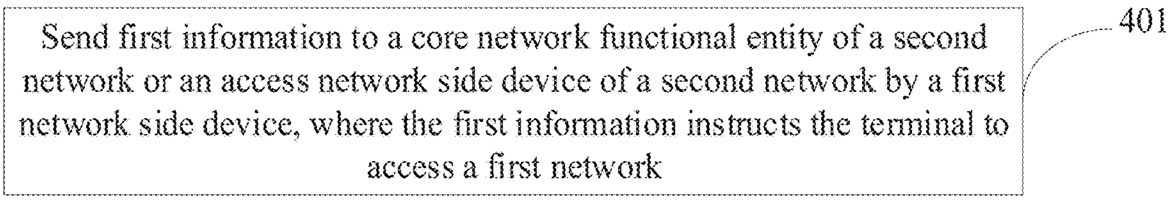

An embodiment of this application provides a network access guide method, as shown in FIG. 5, including:

Step 401: Send first information to a core network functional entity of a second network or an access network side device of a second network by a first network side device, where the first information instructs a terminal to access a first network.

In some embodiments, the terminal has previously accessed the first network.

In some embodiments, the first information is used to indicate that a disaster condition of the first network is terminated.

In some embodiments, the following is further included:

sending second information by the first network side device through an air interface, where the second information indicates that the first network is capable of providing an access service.

In the embodiments of this application, after the disaster condition of the first network is terminated, the terminal that has accessed the first network can be notified that the disaster condition of the first network is terminated, so that the first network terminal deregisters the second network, performs PLMN selection, network selection, or network reselection, and prevents the first network UE from continuing to occupy the second network resource after the disaster condition is terminated causing bad experience of the second network UE.

Technical solutions of this application are further described below with reference to the accompanying drawings and specific embodiments. In the embodiments of this application, the first network means a network or a PLMN under a disaster condition, and the second network means a network or a PLMN providing services for the first network under a disaster condition. The second network includes a core network functional entity of a second network and an access network side device of a second network.

Embodiment 1

In this embodiment, for the first network UE connected to the second network, when the first network terminates the disaster condition, the second network deregisters the first network UE connected to the second network through a deregistration request message, and carries information of the first network terminating the disaster condition in the deregistration message.

Figure 6:
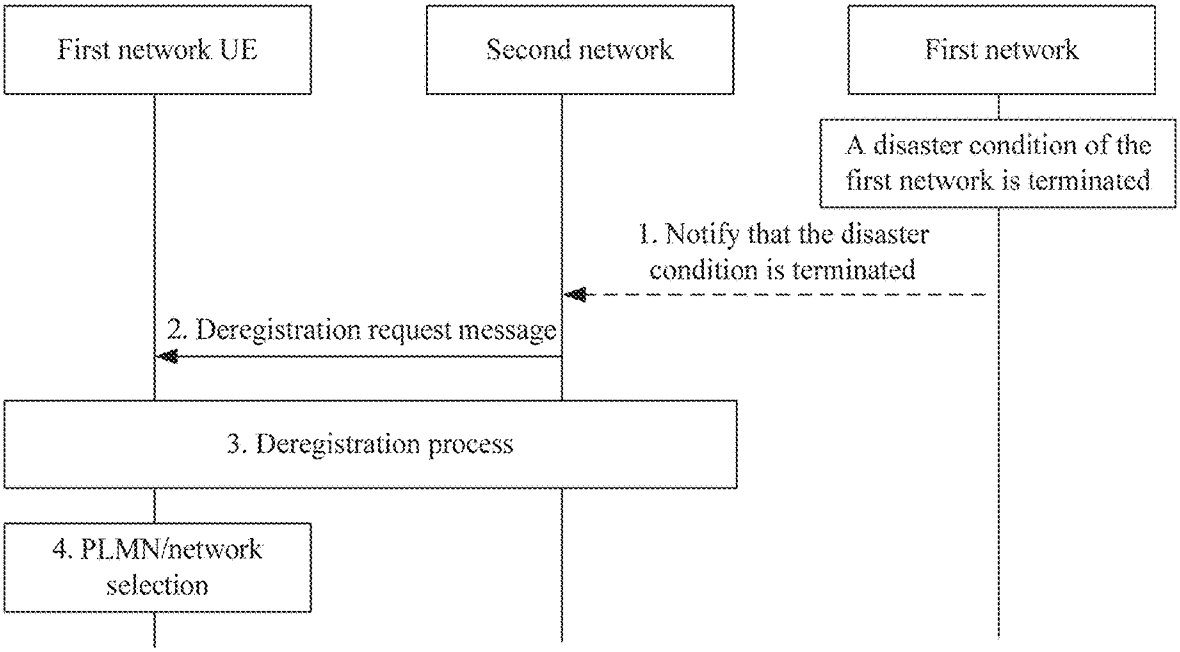
FIG. 6 to FIG. 9 are schematic diagrams of the signaling interaction of a network access guide method according to an embodiment of this application.

As shown in FIG. 6, this embodiment includes the following step.

Step 1: The first network notifies the second network that the disaster condition is terminated. Step 1 is an optional step. Before step 1, the disaster condition of the first network is terminated.

Step 2: After learning that the first network terminated the disaster condition, the second network deregisters the first network UE. The second network carries disaster condition termination information in the deregistration request message. The disaster condition termination information may be a piece of indication information or a new cause value. The indication information indicates that the first network terminates the disaster condition, and the new cause value indicates that the first network terminates the disaster condition.

Step 3: The first network UE receives information of the first network terminating the disaster condition, and the first network UE executes a subsequent deregistration process.

Step 4: After the deregistration process is completed, the first network UE performs PLMN selection or network selection. When a network is selected, a PLMN in the forbidden PLMN list cannot be selected.

As shown in Table 1, IE "Disaster condition terminated indication" can be added in the deregistration request message. Presence is Optional, Format is TV, and Length is 1 byte. For coding of disaster condition terminated indication: disaster condition terminated indication is a type 1 information element. The structure thereof is shown in Table 2 or Table 3, and is octet. When the first bit of eight bits is coded as "1", it indicates that the disaster condition is terminated. When the bit is coded as "0", it indicates that the disaster condition is not terminated. The second to fourth bits are coded as 0, and the fifth to eighth bits are identifiers of disaster condition terminated indication information elements.

TABLE 1

DEREGISTRATION REQUEST message content

| IEI | Information Element | Type/Reference | Presence | Format | Length |
|---|---|---|---|---|---|
| | Extended protocol discriminator | Extended protocol discriminator | M | V | 1 |
| | Security header type | Security header type | M | V | ½ |
| | Spare half octet | Spare half octet | M | V | ½ |
| | De-registration request message identity | Message type | M | V | 1 |
| | De-registration type | De-registration type | M | V | ½ |
| | Spare half octet | Spare half octet | M | V | ½ |
| 58 | 5GMM cause | 5GMM cause | O | TV | 2 |
| 5F | T3346 value | GPRS timer 2 | O | TLV | 3 |
| 6D | Rejected NSSAI | Rejected NSSAI | O | TLV | 4-42 |
| | Disaster condition termination | Disaster condition termination | O | TV | 1 |

O means Optional, M means Mandatory, TV means Type Value, and a unit of Length is a byte.

TABLE 2

Disaster condition terminated indication

| | | | | |
|---|---|---|---|---|
| Disaster condition terminated indication IEI | 0 Spare | 0 Spare | 0 Spare | DCTI |

TABLE 3

Disaster condition terminated indication
Disaster condition terminated indication (DCTI) (octet 1)

| Bit | |
|---|---|
| 1 | |
| 1 | |
| 0 | Disaster condition is not terminated |
| 1 | Disaster condition is terminated |
| Bits 2, 3 and 4 are spare and shall be coded as zero | |

TABLE 4

5GMM (mobility management) cause information element
Cause value (octet 2)

| Bits | | | | | | | | |
|---|---|---|---|---|---|---|---|---|
| | 0 | 0 | 0 | 0 | 0 | 1 | 1 | Illegal UE |
| 0 | 0 | 0 | 0 | 0 | 1 | 0 | 1 | PEI not accepted |
| 0 | 0 | 0 | 0 | 0 | 1 | 1 | 0 | Illegal ME |
| 0 | 0 | 0 | 0 | 0 | 1 | 1 | 1 | 5GS services not allowed |
| 0 | 0 | 0 | 0 | 1 | 0 | 0 | 1 | UE identity cannot be derived by the network |
| 0 | 0 | 0 | 0 | 1 | 0 | 1 | 0 | Implicitly de-registered |
| 0 | 0 | 0 | 0 | 1 | 0 | 1 | 1 | PLMN not allowed |

TABLE 4-continued

| 5GMM (mobility management) cause information element Cause value (octet 2) | | | | | | | | |
|---|---|---|---|---|---|---|---|---|
| Bits | | | | | | | | |
| 0 | 0 | 0 | 0 | 1 | 1 | 0 | 0 | Tracking area not allowed |
| 0 | 0 | 0 | 0 | 1 | 1 | 0 | 1 | Roaming not allowed in this tracking area |
| 0 | 0 | 0 | 0 | 1 | 1 | 1 | 1 | No suitable cells in tracking area |
| 0 | 0 | 0 | 1 | 0 | 1 | 0 | 0 | MAC failure |
| 0 | 0 | 0 | 1 | 0 | 1 | 0 | 1 | Synch failure |
| 0 | 0 | 0 | 1 | 0 | 1 | 1 | 0 | Congestion |
| 0 | 0 | 0 | 1 | 0 | 1 | 1 | 1 | UE security capabilities mismatch |
| 0 | 0 | 0 | 1 | 1 | 0 | 0 | 0 | Security mode rejected, unspecified |
| 0 | 0 | 0 | 1 | 1 | 0 | 1 | 0 | Non-5G authentication unacceptable |
| 0 | 0 | 0 | 1 | 1 | 0 | 1 | 1 | N1 mode not allowed |
| 0 | 0 | 0 | 1 | 1 | 1 | 0 | 0 | Restricted service area |
| 0 | 0 | 0 | 1 | 1 | 1 | 1 | 1 | Redirection to EPC required |
| 0 | 0 | 1 | 0 | 1 | 0 | 1 | 1 | LADN not available |
| 0 | 0 | 1 | 1 | 1 | 1 | 1 | 0 | No network slices available |
| 0 | 1 | 0 | 0 | 0 | 0 | 0 | 1 | Maximum number of PDU sessions reached |
| 0 | 1 | 0 | 0 | 0 | 0 | 1 | 1 | insufficient resources for specific slice and DNN |
| 0 | 1 | 0 | 0 | 0 | 1 | 0 | 1 | Insufficient resources for specific slice |
| 0 | 1 | 0 | 0 | 0 | 1 | 1 | 1 | ngKSI already in use |
| 0 | 1 | 0 | 0 | 1 | 0 | 0 | 0 | Non-3GPP access to 5GCN not allowed |
| 0 | 1 | 0 | 0 | 1 | 0 | 0 | 1 | Serving network not authorized |
| 0 | 1 | 0 | 0 | 1 | 0 | 1 | 0 | Temporarily not authorized for this SNPN |
| 0 | 1 | 0 | 0 | 1 | 0 | 1 | 1 | Permanently not authorized for this SNPN |
| 0 | 1 | 0 | 0 | 1 | 1 | 0 | 0 | Not authorized for this CAG or authorized for CAG cells only |
| 0 | 1 | 0 | 0 | 1 | 1 | 0 | 1 | Wireline access area not allowed |
| 0 | 1 | 0 | 1 | 1 | 0 | 1 | 0 | Payload was not forwarded |
| 0 | 1 | 0 | 1 | 1 | 0 | 1 | 1 | DNN not supported or not subscribed in the slice |
| 0 | 1 | 0 | 1 | 1 | 1 | 0 | 0 | Insufficient user-plane resources for the PDU session |
| 0 | 1 | 0 | 1 | 1 | 1 | 1 | 1 | Semantically incorrect message |
| 0 | 1 | 1 | 0 | 0 | 0 | 0 | 0 | Invalid mandatory information |
| 0 | 1 | 1 | 0 | 0 | 0 | 0 | 1 | Message type non-existent or not implemented |
| 0 | 1 | 1 | 0 | 0 | 0 | 1 | 0 | Message type not compatible with the protocol state |
| 0 | 1 | 1 | 0 | 0 | 0 | 1 | 1 | Information element non-existent or not implemented |
| 0 | 1 | 1 | 0 | 0 | 1 | 0 | 0 | Conditional IE error |
| 0 | 1 | 1 | 0 | 0 | 1 | 0 | 1 | Message not compatible with the protocol state |
| 0 | 1 | 1 | 0 | 1 | 1 | 1 | 1 | Protocol error, unspecified |
| 0 | 1 | 1 | 0 | 0 | 1 | 1 | 0 | Disaster condition termination |

Any other value received by a mobile station should be regarded as 0110 1111, and "protocol error, unspecified". Any other value received by a network should be regarded as 0110 1111, and "protocol error, unspecified".

The 5GMM cause information elements are shown in Table 4. A cause value can be added to the 5GMM to indicate that the disaster is terminated. As shown in Table 5, the 5GMM cause is an information element with a length of 2 bytes. The cause value of the second byte can be used to indicate whether the disaster is terminated.

TABLE 5

| 5GMM cause information element | |
|---|---|
| 5GMM cause IEI | octet 1 |
| Cause value | octet 2 |

Embodiment 2

In this embodiment, for the first network UE connected to the second network, when the first network terminates the disaster condition, the second network rejects the first network UE's access by rejecting a request of the first network UE, and carries information of the first network terminating the disaster condition in the rejection message.

Figure 7:
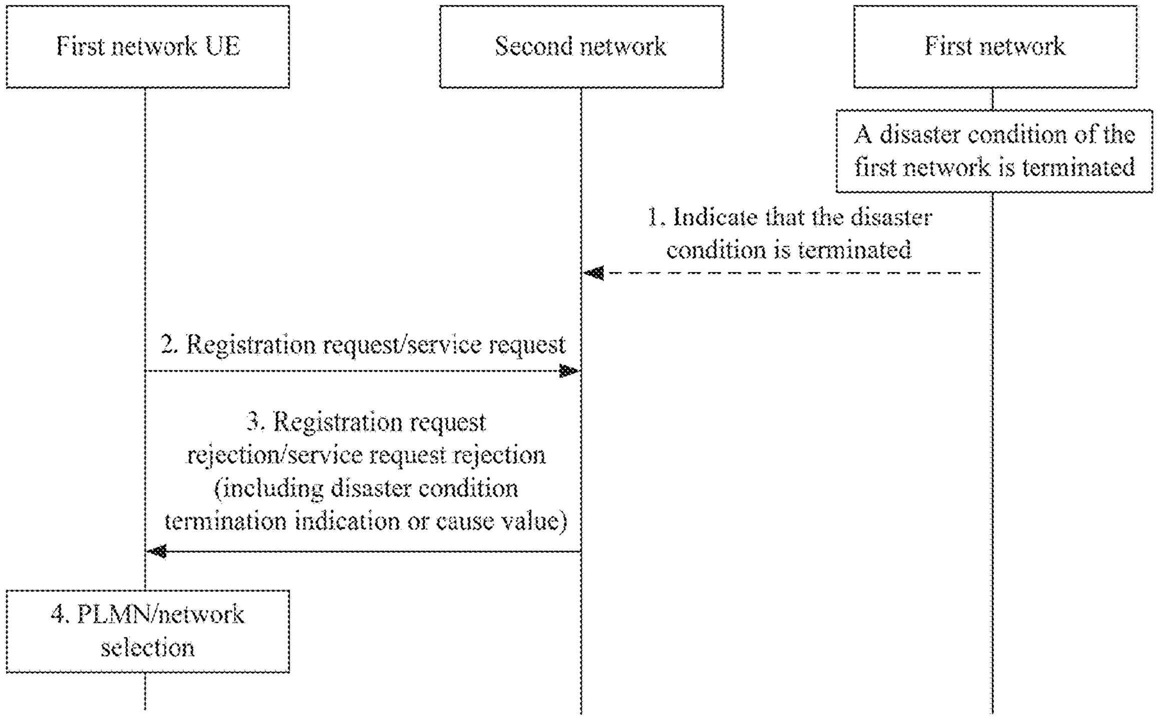

As shown in FIG. 7, this embodiment includes the following step.

Step 1: The first network notifies the second network that the disaster condition is terminated. Step 1 is an optional step. Before step 1, the disaster condition of the first network is terminated.

Step 2: The first network UE sends a registration request or a service request, or another NAS request (such as SM process) to the second network.

Step 3: After the second network learns that the disaster condition of the first network is terminated, the second network rejects the registration request or the service request or other NAS requests of the first network UE. The disaster condition information of the first network is contained in a registration request rejection message, a service request rejection message, or another NAS request message. The disaster condition termination information may be direct indication information or a new cause value. The indication information indicates that the first network terminates the disaster condition, and the new cause value indicates that the first network terminates the disaster condition.

Step 4: The first network UE performs PLMN selection or network selection. A PLMN in the forbidden PLMN list cannot be selected during the network selection.

As shown in Table 6 or Table 7, E "Disaster condition terminated indication" can be added to the registration rejection message or the service request rejection message as disaster condition termination indication information of the first network. Presence is Optional, Format is TV and Length is 1 byte.

For coding of disaster condition terminated indication: disaster condition terminated indication is a type 1 information element. The structure thereof is shown in Table 2 or Table 3, when the first bit of eight bits is coded as "1", it indicates that the disaster condition is terminated. When the bit is coded as "0", it indicates that the disaster condition is not terminated. The second to fourth bits are coded as 0, and the fifth to eighth bits are identifiers of disaster condition terminated indication information elements.

TABLE 6

REGISTRATION REJECT message content

| IEI | Information Element | Type/Reference | Presence | Format | Length |
|---|---|---|---|---|---|
| | Extended protocol discriminator | Extended protocol discriminator | M | V | 1 |
| | Security header type | Security header type | M | V | ½ |
| | Spare half octet | Spare half octet | M | V | ½ |
| | Registration reject message identity | Message type | M | V | 1 |
| | 5GMM cause | 5GMM cause | M | V | 1 |
| 5F | T3346 value | GPRS timer 2 | O | TLV | 3 |
| 16 | T3502 value | GPRS timer 2 | O | TLV | 3 |
| 78 | EAP message | EAP message | O | TLV-E | 7-1503 |
| 69 | Rejected NSSAI | Rejected NSSAI | O | TLV | 4-42 |
| 75 | CAG information list | CAG information list | O | TLV-E | 3-n |
| x | Disaster condition termination | Disaster condition termination | O | TV | 1 |

TABLE 7

SERVICE REJECT message content

| IEI | Information Element | Type/Reference | Presence | Format | Length |
|---|---|---|---|---|---|
| | Extended protocol discriminator | Extended protocol discriminator | M | V | 1 |
| | Security header type | Security header type | M | V | ½ |
| | Spare half octet | Spare half octet | M | V | ½ |
| | Service reject message identity | Message type | M | V | 1 |
| | 5GMM cause | 5GMM cause | M | V | 1 |
| 50 | PDU session status | PDU session status | O | TLV | 4-34 |
| 5F | T3346 value | GPRS timer 2 | O | TLV | 3 |
| 78 | EAP message | EAP message | O | TLV-E | 7-1503 |
| 6B | T3448 value | GPRS tinier 3 | O | TLV | 3 |
| 75 | CAG information list | CAG information list | O | TLV-E | 3-n |
| x | Disaster condition terminated indication | Disaster condition termination | O | TV | 1 |

The 5GMM cause information element is as shown in Table 4. A cause value can be added to the 5GMM to indicate that the disaster is terminated. As shown in Table 5, the 5GMM cause is an information element with a length of 2 bytes. The cause value of the second byte can be used to indicate whether the disaster is terminated.

Embodiment 3

In this embodiment, after terminating the disaster condition, the first network sends a system message. The system message carries information of the first network terminating the disaster condition. After receiving the system message, the first network UE initiates a deregistration process to the second network.

Figure 8:
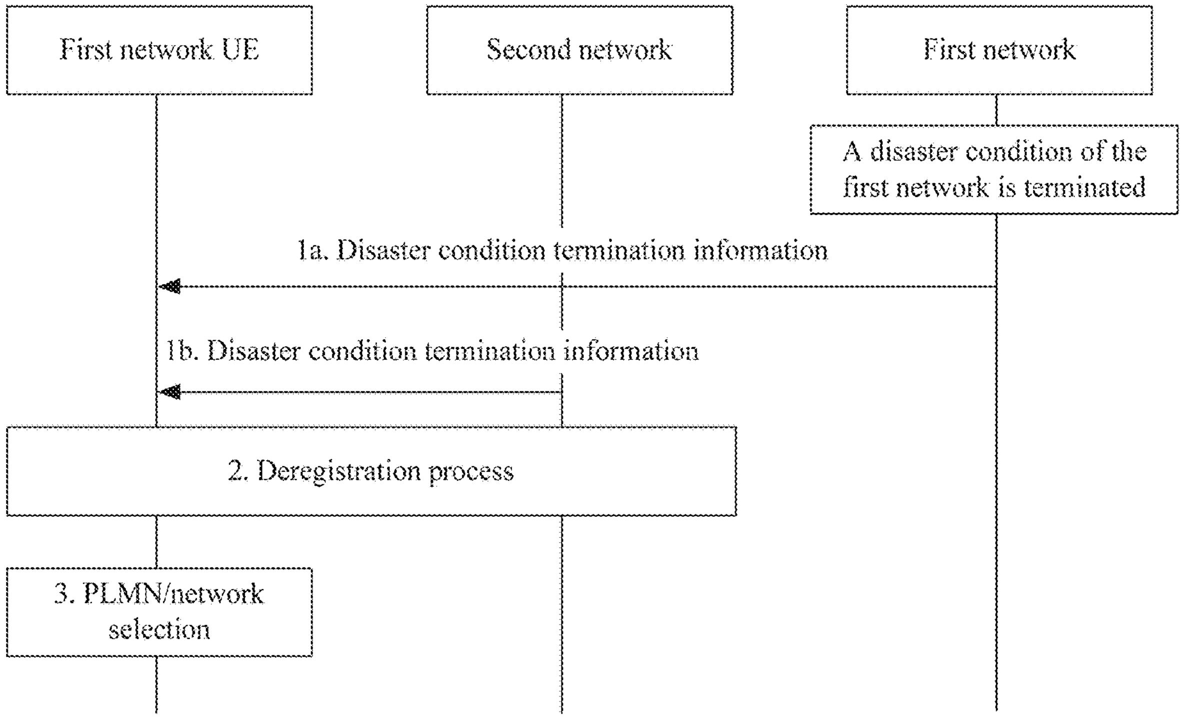

As shown in FIG. 8, this embodiment includes the following step.

Step 1*a*: The first network notifies the first network UE that the disaster condition is terminated, and the disaster condition termination information can be contained in the system message. Before step 1*a*, the disaster condition of the first network is terminated.

Step 1*b*: The second network notifies the first network UE that the disaster condition is terminated, and the disaster condition termination information can be contained in the system message or an AS layer message.

The sequence of step 1*a* and step 1*b* is not limited. Step 1*a* and step 1*b* can be performed, or any one of Step 1*a* or step 1*b* can be performed.

Step 2: The first network UE initiates the deregistration process to the second network after receiving the disaster condition termination information.

Step 3: After the deregistration process is completed, the first network UE performs PLMN selection or network selection. A PLMN in the forbidden PLMN list cannot be selected during network selection.

Embodiment 4

In this embodiment, for the first network UE connected to the second network, when the first network terminates the disaster condition, the second network rejects the first network UE's access by rejecting an AS request of the first network UE, and carries information of the first network terminating the disaster condition in a rejection message for AS request.

Figure 9:
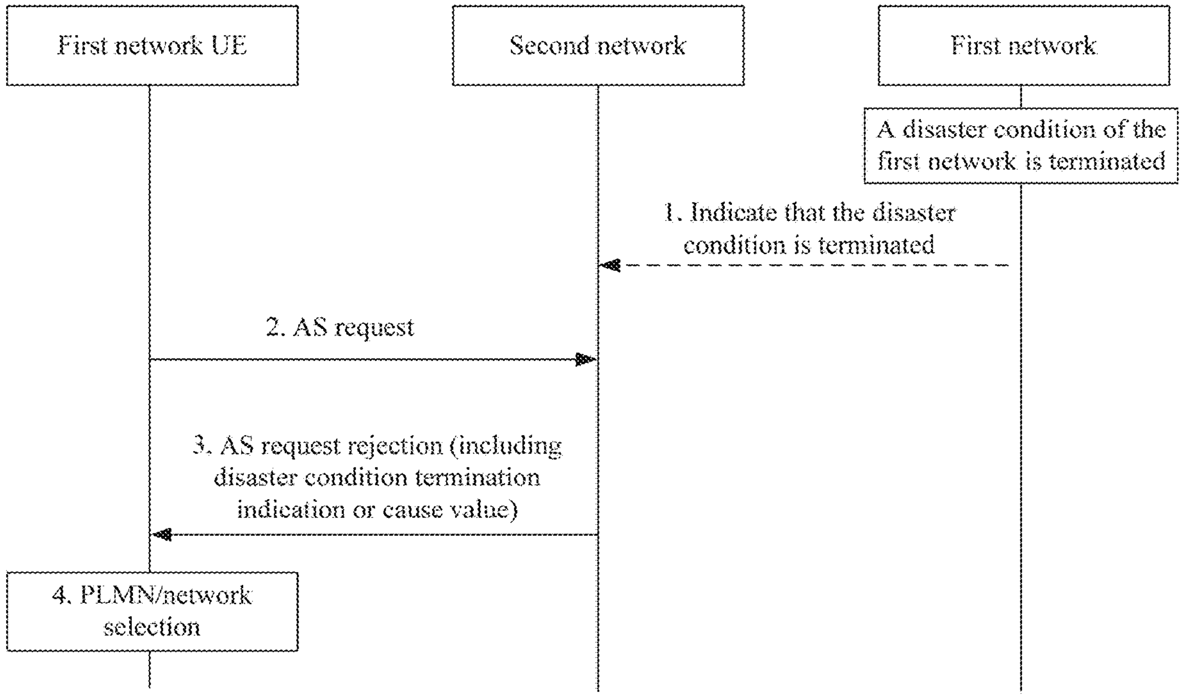

As shown in FIG. 9, this embodiment includes the following step.

Step 1: The first network notifies the second network that the first network terminates the disaster condition. Step 1 is an optional step. Before step 1, the disaster condition of the first network is terminated.

Step 2: The first network UE initiates an AS request message to the second network.

Step 3: After the second network learns that the disaster condition of the first network is terminated, the second network rejects an AS request of the first network, and the information of the first network terminating the disaster condition is contained in a rejection message for AS request. The disaster condition termination information may be direct indication information or a new cause value. The indication information indicates that the first network terminates the disaster condition, and the new cause value indicates that the first network terminates the disaster condition.

Step 4: The first network UE performs PLMN selection or network selection. A PLMN in the forbidden PLMN list cannot be selected during the network selection.

This embodiment can avoid that the first network UE continues to occupy resources of the second network after the disaster condition is terminated causing bad experience of the second network UE.

It should be noted that an execution subject of the network access guide method according to an embodiment of this application may be a network access guide apparatus, or a module for performing and loading the network access guide method in the network access guide apparatus. In this embodiment of this application, the network access guide method according to an embodiment of this application is described by using an example in which the network access guide apparatus performs the network access guide method.

Figure 10:
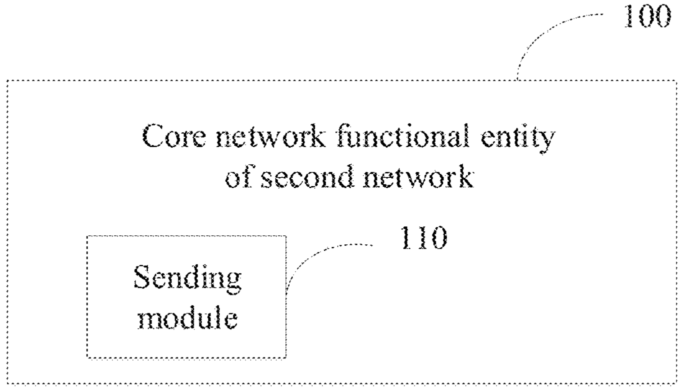
FIG. 10 to FIG. 13 are structural diagrams of a network access guide apparatus according to an embodiment of this application.

This embodiment of this application provides a network access guide apparatus that is applied to a second network side core network functional entity 100. As shown in FIG. 10, the apparatus includes:

a sending module 110, configured to send assistance information to a second network access network side device, where the assistance information is used to instruct a terminal to access a first network.

In some embodiments, the terminal has previously accessed the first network.

In some embodiments, the assistance information is sent through at least one of the following:

a non-access stratum NAS message: or a NGAP message of an interface between a core network and an access network side device.

In some embodiments, the assistance information includes at least one of the following: information of the first network; indication information; a cause value; or information of the terminal.

In some embodiments, the indication information is at least one of the following: a deregistration message; or a release message.

In some embodiments, the cause value indicates that the disaster condition is terminated.

In some embodiments, the information of the terminal includes at least one of the following: a user identifier; or a device identifier of the terminal.

In some embodiments, the assistance information is one piece of indication information or one cause value.

In some embodiments, the apparatus further includes:

a receiving module, configured to receive first information of the first network.

In some embodiments, the first information indicates that a disaster condition of the first network is terminated.

Figure 11:
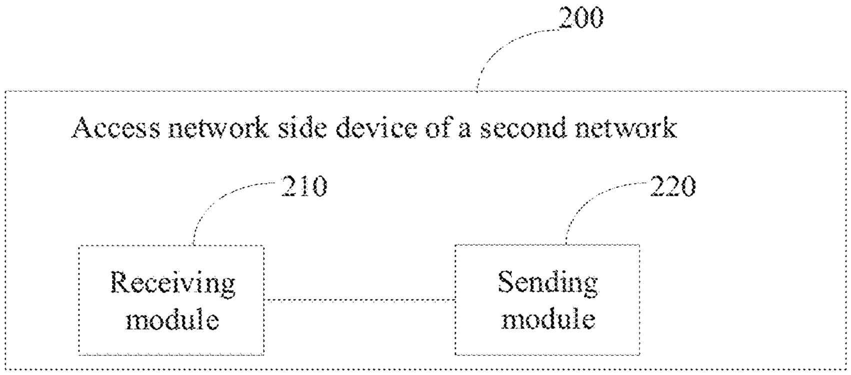

This embodiment of this application provides a network access guide apparatus, which is applied to a second network access network side device 200. As shown in FIG. 11, the apparatus includes:

a receiving module 210, configured to receive assistance information of a second network side core network functional entity, where the assistance information is used to instruct a terminal to access a first network; and a sending module 220, configured to send the assistance information through an air interface.

In some embodiments, the assistance information includes at least one of the following: information of the first network; indication information; a cause value; or information of the terminal.

In some embodiments, the indication information is at least one of the following: a deregistration message; or a release message.

In some embodiments, the cause value indicates that the disaster condition is terminated.

In some embodiments, the information of the terminal includes at least one of the following: a user identifier; or a device identifier of the terminal.

In some embodiments, the assistance information is sent through at least one of the following:

a broadcast message;

a non-access stratum NAS message: or an access stratum AS message.

Figure 12:
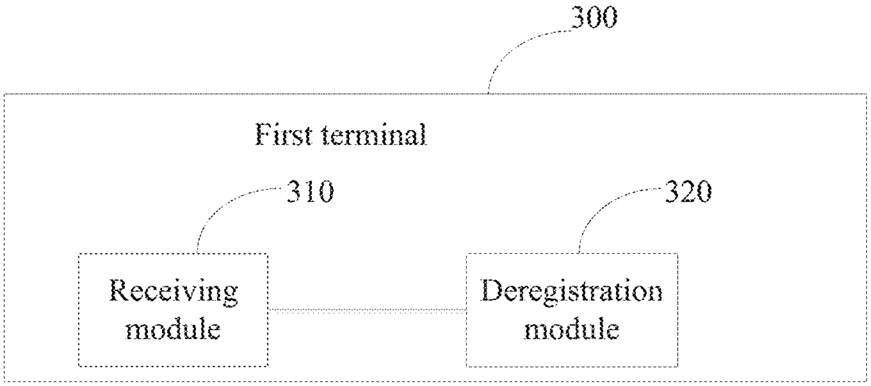

This embodiment of this application provides a network access guide apparatus, which is applied to a first terminal 300. As shown in FIG. 12, the apparatus includes:

a receiving module 310, configured to receive assistance information of a second network access network side device, where the assistance information is used to instruct a first terminal to access a first network; and a deregistration module 320, configured to execute a deregistration process based on the assistance information.

In some embodiments, the first terminal has previously accessed the first network.

In some embodiments, the assistance information is included in at least one of the following:

a broadcast message;

a non-access stratum NAS message; or an access stratum AS message.

In some embodiments, the NAS message includes a deregistration request message and/or a rejection message for NAS request, and the AS message includes a rejection message for AS request. In some embodiments, the following is further included:

a processing module, configured to perform public land mobile network PLMN selection, network selection, or network reselection based on the assistance information.

In some embodiments, the processing module selects a PLMN out of a forbidden PLMN list.

In some embodiments, the receiving module is further configured to receive first information of the first network, where the first information indicates that a disaster condition of the first network is relieved, and the first information is contained in a system message of the first network.

Figure 13:
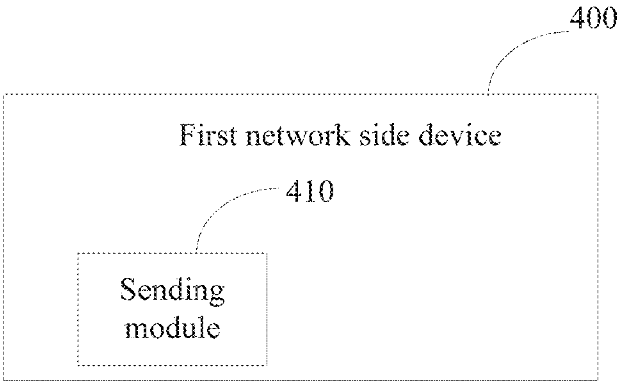

This embodiment of this application provides a network access guide apparatus, which is applied to a first network side device 400. As shown in FIG. 13, the apparatus includes:

a sending module 410, configured to send first information to a second network side core network functional entity or a second network access network side device, where the first information indicates that a terminal accesses a first network.

In some embodiments, the terminal has previously accessed the first network.

In some embodiments, the first information is used to indicate that a disaster condition of the first network is terminated.

In some embodiments, the sending module is further configured to send second information through an air interface, where the second information indicates that the first network is capable of providing an access service.

In the embodiments of this application, after the disaster condition of the first network is terminated, the terminal that has accessed the first network can be notified that the disaster condition of the first network is terminated, so that the first network terminal deregisters the second network, performs PLMN selection, network selection, or network reselection, and prevents the first network UE from continuing to occupy the second network resource after the disaster condition is terminated causing bad experience of the second network UE.

The network access guide apparatus in this embodiment of this application may be an apparatus, or a component, an integrated circuit, or a chip in a terminal. The apparatus may be a mobile electronic device, or may be a non-mobile electronic device. For example, the mobile electronic device may be a mobile phone, a tablet computer, a notebook computer, a palmtop computer, an in-vehicle electronic device, a wearable device, an ultra-mobile personal computer (UMPC), a netbook, a personal digital assistant (PDA), or the like. The non-mobile electronic device may be a Network Attached Storage (NAS), a personal computer (PC), a television (TV), a teller machine, a self-service machine, or the like. This is not specifically limited in the embodiments of this application.

The network access guide apparatus in the embodiments of this application may be an apparatus with an operating system. The operating system may be an Android operating system, an iOS operating system, or another possible operating system, which is not specifically limited in the embodiments of this application.

An embodiment of this application further provides an electronic device, including a processor, a memory, and a program or an instruction stored in the memory and capable of running on the processor. When the program or the instruction is executed by the processor, the processes of the foregoing network access guide method embodiments are implemented, with the same technical effects achieved. To avoid repetition, details are not described herein again.

It should be noted that the electronic device in this embodiment of this application includes the foregoing mobile electronic device and the foregoing non-mobile electronic device.

Figure 14:
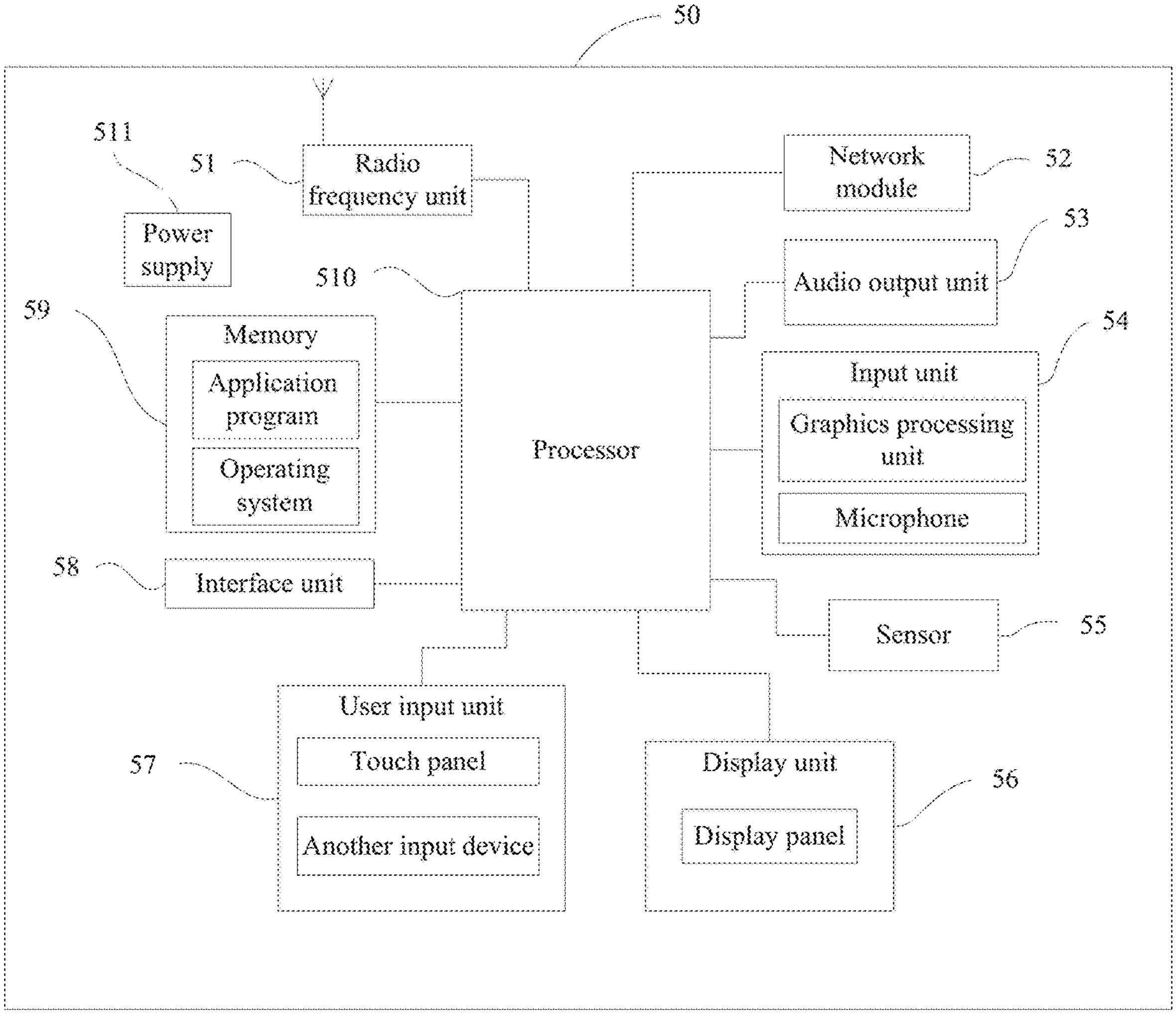
FIG. 14 is a schematic diagram of composition of a terminal according to an embodiment of this application.

The electronic device in this embodiment may be a terminal. FIG. 14 is a schematic diagram of a hardware structure of a terminal according to the embodiments of this application. The terminal 50 includes but is not limited to components such as a radio frequency unit 51, a network module 52, an audio output unit 53, an input unit 54, a sensor 55, a display unit 56, a user input unit 57, an interface unit 58, a memory 59, a processor 510, and a power supply 511. It can be understood by a person skilled in the art that, the terminal structure shown in FIG. 14 does not constitute any limitation on the terminal, and the terminal may include more or fewer components than those shown in the figure, or combine some components, or have different component arrangements. In this embodiment of this application, the terminal includes but is not limited to a mobile phone, a tablet computer, a notebook computer, a palmtop computer, an in-vehicle terminal, a wearable device, a pedometer, and the like.

It should be understood that, in this embodiment of this application, the radio frequency unit 51 may be configured to receive and send information or a signal in a call process. In some embodiments, after receiving downlink data from a base station, the radio frequency unit 51 sends the downlink data to the processor 510 for processing. In addition, the radio frequency unit 51 sends uplink data to the base station. Usually, the radio frequency unit 51 includes but is not limited to an antenna, at least one amplifier, a transceiver, a coupler, a low noise amplifier, a duplexer, and the like. In addition, the radio frequency unit 51 may further communicate with a network and another device through a wireless communications system.

The memory 59 may be configured to store a software program and various pieces of data. The memory 59 may mainly include a program storage region and a data storage region. The program storage region may store an operating system, an application program required by at least one function (such as a sound play function or an image play function), and the like. The data storage region may store data (such as audio data or an address book) created based on use of the mobile phone, and the like. In addition, the memory 59 may include a high-speed random access memory, and may further include a nonvolatile memory, for example, at least one magnetic disk storage device, a flash storage device, or another volatile solid-state storage device.

The processor 510 is a control center of the terminal, and connects all parts of the entire terminal by using various interfaces and lines. By running or executing a software program and/or a module stored in the memory 59 and invoking data stored in the memory 59, the processor 510 performs various functions of the terminal and data processing, to perform overall monitoring on the terminal. The processor 510 may include one or at least two processing units. In some embodiments, the processor 510 may integrate an application processor and a modem processor. The application processor mainly processes an operating system, a user interface, an application program, and the like. The modem processor mainly processes wireless communication. It can be understood that the modem processor may not be integrated into the processor 510.

The terminal 50 may further include the power supply 511 (such as a battery) that supplies power to each component. In some embodiments, the power supply 511 may be logically connected to the processor 510 by using a power management system, so as to implement functions such as charging, discharging, and power consumption management by using the power management system.

In addition, the terminal 50 includes some function modules not shown, and details are not described herein.

The processor 510 is configured to perform the network access guide method shown in FIG. 4. To avoid repetition, details are not described herein again.

Figure 15:
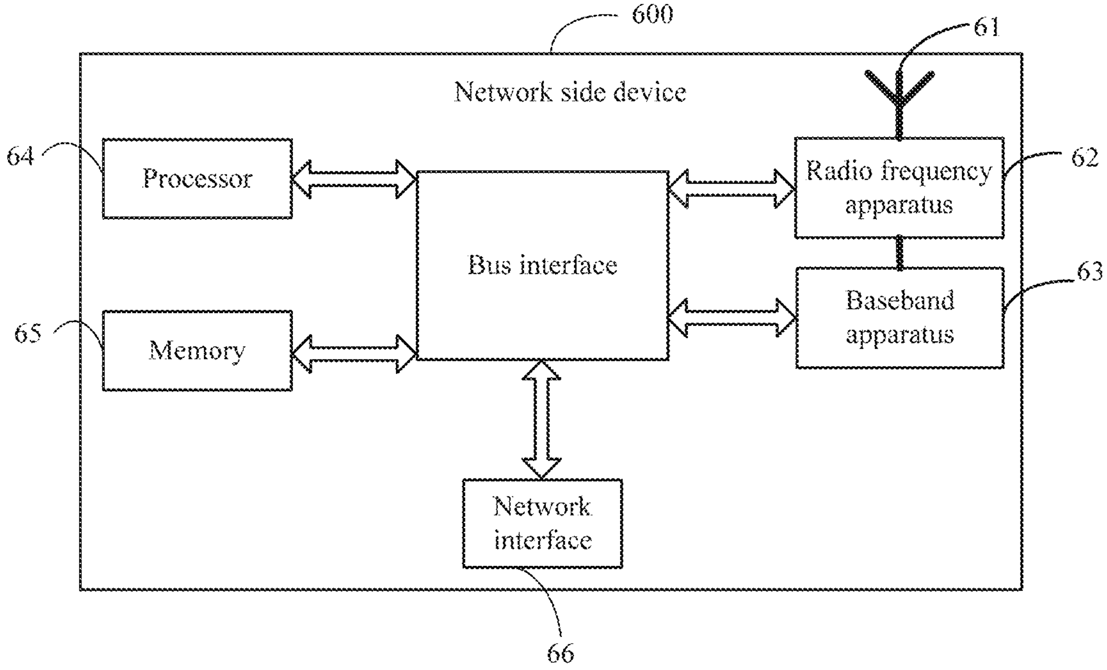
FIG. 15 is a schematic diagram of composition of a network side device according to an embodiment of this application.

The electronic device in this embodiment may also be a network-side device. As shown in FIG. 15, the network-side device 600 includes an antenna 61, a radio frequency apparatus 62, and a baseband apparatus 63. The antenna 61 is connected to the radio frequency apparatus 62.

In an uplink direction, the radio frequency apparatus 62 receives information by using the antenna 61, and transmits the received information to the baseband apparatus 63 for processing. In a downlink direction, the baseband apparatus 63 processes information that needs to be sent, and sends processed information to the radio frequency apparatus 62. The radio frequency apparatus 62 processes the received information, and sends processed information by using the antenna 61.

The frequency band processing apparatus may be located in the baseband apparatus 63. The method performed by the network side device in the above embodiment may be implemented in the baseband apparatus 63. The baseband apparatus 63 includes a processor 64 and a memory 65.

For example, the baseband apparatus 63 may include at least one baseband board. Multiple chips are disposed on the baseband board. As shown in FIG. 15, one chip is, for example, the processor 64, and is connected to the memory 65, to invoke a program in the memory 65 to perform an operation of the network-side device shown in the foregoing method embodiment.

The baseband apparatus 63 may further include a network interface 66, configured to exchange information with the radio frequency apparatus 62. For example, the interface is a common public radio interface (CPRI).

The processor herein may be one processor, or may be a general name of a plurality of processing elements. For example, the processor may be a CPU, or may be an ASIC, or one or more integrated circuits configured to implement the method performed by the foregoing network side device, for example, one or more microprocessors (DSP), or one or more field programmable gate arrays (FPGA). A storage element may be a memory, or may be a general term of a plurality of storage elements.

The memory 65 may be a volatile memory or a nonvolatile memory, or may include a volatile memory and a nonvolatile memory. The non-volatile memory may be a Read-only Memory (ROM), a Programmable ROM (PROM), an Erasable PROM (EPROM), an Electrically EPROM (EEPROM), or a flash memory. The volatile memory may be a Random Access Memory (RAM), used as an external cache. By way of example rather than limitative description, RAMs in many forms may be used, for example, a Static RAM (SRAM), a Dynamic RAM (DRAM), a Synchronous DRAM (SDRAM), a Double Data Rate SDRAM (DDRSDRAM), an Enhanced SDRAM (ES- DRAM), a Synchlink DRAM (SLDRAM), and a Direct Rambus RAM (DRRAM). The memory 65 described in this specification is intended to include but is not limited to these memories and any memory of another proper type.

In some embodiments, the processor 64 is configured to perform the network access guide method in FIG. 2, FIG. 3, and FIG. 5. To avoid repetition, details are not repeated herein.

An embodiment of this application further provides a readable storage medium. The readable storage medium stores a program or an instruction. When the program or the instruction is executed by a processor, the processes in the foregoing embodiments of the network access guide method are implemented, and a same technical effect can be achieved. To avoid repetition, details are not described herein again.

The processor is a processor in the electronic device in the foregoing embodiment. The readable storage medium includes a computer-readable storage medium such as a computer Read-Only Memory (ROM), a Random Access Memory (RAM), a magnetic disk, an optical disc, or the like.

An embodiment of this application further provides a chip. The chip includes a processor and a communications interface, and the communications interface is coupled to the processor. The processor is configured to run a program or an instruction, to implement various processes of the foregoing network access guide method embodiments, with the same technical effects achieved. To avoid repetition, details are not described herein again.

It should be understood that the chip mentioned in this embodiment of the present application may also be referred to as a system-level chip, a system chip, a system on chip, a system chip on chip, and the like.

An embodiment of this application provides a program product. The program product is stored in a non-transitory readable storage medium. The program product is executed by a processor to implement various processes of the foregoing network access guide method embodiments, with the same technical effects achieved. To avoid repetition, details are not described herein again.

It should be noted that, in this specification, the terms “include”, “comprise”, or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In the absence of more restrictions, an element defined by the statement “including a . . . ” does not preclude the presence of other identical elements in the process, method, article, or apparatus that includes the element. In addition, it should be noted that the scope of the methods and apparatuses in the embodiments of the present application is not limited to performing functions in the order shown or discussed, but may also include performing the functions in a basically simultaneous manner or in opposite order based on the functions involved. For example, the described methods may be performed in a different order from the described order, and various steps may be added, omitted, or combined. In addition, features described with reference to some examples may be combined in other examples.

Based on the descriptions of the foregoing implementation manners, a person skilled in the art may clearly understand that the method in the foregoing embodiment may be implemented by software in addition to a necessary universal hardware platform or by hardware only. Based on such an understanding, the technical solutions of this application essentially, or the part contributing to the related technology may be implemented in a form of a software product. The computer software product is stored in a storage medium (for example, a ROM/RAM, a magnetic disk, or a compact disc), and includes a plurality of instructions for instructing a terminal (which may be a mobile phone, a computer, a server, an air conditioner, a network device, or the like) to perform the method described in the embodiments of this application.

The embodiments of this application are described above with reference to the accompanying drawings, but this application is not limited to the foregoing specific implementation manners. The foregoing specific implementation manners are merely schematic instead of restrictive. Under enlightenment of this application, a person of ordinary skills in the art may make many forms without departing from aims and the protection scope of claims of this application, all of which fall within the protection scope of this application.

The invention claimed is:

1. A network access guide method for a first terminal to access a first network, comprising:

receiving, by the first terminal, assistance information from an access network side device of a second network, wherein the assistance information is used for instructing the first terminal to access the first network, and the assistance information comprises a cause value indicating that a disaster condition of the first network is terminated;

executing, by the first terminal, a deregistration process to the second network in response to receiving the assistance information; and after executing the deregistration process to the second network, performing, by the first terminal, public land mobile network (PLMN) selection, network selection, or network reselection based on the assistance information.

2. The network access guide method according to claim 1, wherein the first terminal has previously accessed the first network.

3. The network access guide method according to claim 1, wherein the assistance information is comprised in at least one of the following:

a broadcast message;

a non-access stratum (NAS) message, comprising a deregistration request message or a rejection message for NAS request; or an access stratum (AS) message, comprising a rejection message for AS request.

4. The network access guide method according to claim 3, wherein the NAS message comprises at least one of the following: a deregistration request message, or a rejection message for the NAS request, and the AS message comprises a rejection message for the AS request.

5. The network access guide method according to claim 1, further comprising:

selecting, by the first terminal, a PLMN out of a forbidden PLMN list.

6. The network access guide method according to claim 1, further comprising:

receiving first information of the first network by the first terminal, wherein the first information indicates that the disaster condition of the first network is terminated, and the first information is contained in a system message of the first network.

7. The network access guide method according to claim 1, wherein the assistance information further comprises at least one of the following:

information of the first network, the information of the first network comprising at least one of a deregistration message or a release message;

indication information that comprises at least one of the following: a deregistration message or a release message; or information of the first terminal, the information of the first network comprising at least one a user identifier or a device identifier of the first terminal.

8. An electronic device, comprising:

a memory storing a computer program; and a processor coupled to the memory and configured to execute the computer program to perform operations comprising:

receiving, by a first terminal, assistance information from an access network side device of a second network, wherein the assistance information is used for instructing the first terminal to access the first network, and the assistance information comprises a cause value indicating that a disaster condition of the first network is terminated;

executing, by the first terminal, a deregistration process to the second network in response to receiving the assistance information; and after executing the deregistration process to the second network, performing, by the first terminal, public land mobile network (PLMN) selection, network selection, or network reselection based on the assistance information.

9. The electronic device according to claim 8, wherein the first terminal has previously accessed the first network.

10. The electronic device according to claim 8, wherein the assistance information further comprises at least one of the following:

information of the first network, the information of the first network comprising at least one of a deregistration message or a release message;

indication information that comprises at least one of the following: a deregistration message or a release message; or information of the first terminal, the information of the first network comprising at least one a user identifier or a device identifier of the first terminal.

11. The electronic device according to claim 8, wherein the assistance information is comprised in at least one of the following:

a broadcast message;

a non-access stratum (NAS) message, comprising a deregistration request message or a rejection message for NAS request; or an access stratum (AS) message, comprising a rejection message for AS request.

12. The electronic device according to claim 11, wherein the NAS message comprises at least one of the following: a deregistration request message, or a rejection message for the NAS request, and the AS message comprises a rejection message for the AS request.

13. The electronic device according to claim 8, wherein the operations further comprises:

selecting, by the first terminal, selects a PLMN out of a forbidden PLMN list.

14. The electronic device according to claim 8, wherein the operations further comprises:

receiving, by the first terminal, first information of the first network, wherein the first information indicates that the disaster condition of the first network is terminated, and the first information is contained in a system message of the first network.

* * * * *